United States Patent
Pullmann et al.

(10) Patent No.: US 7,130,171 B2
(45) Date of Patent: Oct. 31, 2006

(54) APPARATUS FOR FAIL-SAFELY DISCONNECTING AN ELECTRICAL LOAD; IN PARTICULAR IN INDUSTRIAL PRODUCTION PLANTS

(75) Inventors: Juergen Pullmann, Ebersbach (DE); Gerhard Ehrlich, Reichenbach (DE)

(73) Assignee: Pilz GmbH & Co., Ostfildern (DE)

( * ) Notice: Subject to any disclaimer, the term of this patent is extended or adjusted under 35 U.S.C. 154(b) by 195 days.

(21) Appl. No.: 10/957,286

(22) Filed: Oct. 1, 2004

(65) Prior Publication Data

US 2005/0057868 A1 Mar. 17, 2005

Related U.S. Application Data

(63) Continuation of application No. PCT/EP03/02903, filed on Mar. 20, 2003.

(30) Foreign Application Priority Data

Apr. 8, 2002 (DE) .............................. 102 16 226

(51) Int. Cl.
*H02H 7/00* (2006.01)
(52) U.S. Cl. ..................................... 361/62
(58) Field of Classification Search ................... 361/62
See application file for complete search history.

(56) References Cited

U.S. PATENT DOCUMENTS

| 4,302,750 | A | * | 11/1981 | Wadhwani et al. .... 340/870.02 |
| 6,628,015 | B1 | * | 9/2003 | Pullmann et al. ........... 307/326 |
| 6,787,940 | B1 | * | 9/2004 | Pullmann ..................... 307/326 |
| 6,825,579 | B1 | * | 11/2004 | Ehrlich et al. .............. 307/113 |
| 2002/0050933 | A1 | | 5/2002 | Donat et al. |
| 2003/0011250 | A1 | | 1/2003 | Pullmann et al. |
| 2004/0160131 | A1 | | 8/2004 | Veil et al. |

FOREIGN PATENT DOCUMENTS

| DE | 100 37 737 A1 | 2/2002 |
| DE | 100 45 651 A1 | 4/2002 |
| DE | 101 09 864 A1 | 9/2002 |
| DE | 101 27 233 C1 | 11/2002 |
| EP | 0 600 311 A2 | 6/1994 |
| WO | WO 01/67610 A1 | 9/2001 |

\* cited by examiner

*Primary Examiner*—Stephen W. Jackson
(74) *Attorney, Agent, or Firm*—Harness, Dickey & Pierce, P.L.C.

(57) ABSTRACT

An apparatus for failsafe disconnection of an electrical load has a first and at least one second safety switching device. The first safety switching device has a first evaluation and control unit, an output and an electronic switching element, for producing a potential-related switching signal at the out-put under the control of the first evaluation and control unit. The second safety switching device has a second evaluation and control unit and an input. The input and the output are connected to one another via a single-channel connecting line, and the input supplies the second evaluation and control unit with the potential-related switching signal from the output of the first safety switching device. In order to fulfill safety standards for such kind of apparatus, the second safety switching device has at least two input circuits to which the potential-related switching signal from the output of the first safety switching device is supplied in a mutually redundant manner.

23 Claims, 3 Drawing Sheets

APPARATUS FOR FAIL-SAFELY DISCONNECTING AN ELECTRICAL LOAD; IN PARTICULAR IN INDUSTRIAL PRODUCTION PLANTS

RELATED APPLICATIONS

The present application is a continuation of international patent application PCT/EP03/02903 filed Mar. 20, 2003 and published as WO 03/085313 in German language, which claims a priority under the Paris convention from German patent application DE 102 16 226.3 filed on Apr. 8, 2002.

BACKGROUND OF THE INVENTION

The present invention generally relates to an apparatus for fail-safely disconnecting an electrical load, and more particularly to an apparatus having a first and at least one second safety switching device. The invention also relates to safety switching devices for use in such an apparatus.

Safety switching devices are particularly used in industrial production environments in order to reliably and safely disconnect machines, such as a hydraulic press or a milling machine, when this is necessary for the safety of operators, or for other reasons. Safety switching devices of this generic type typically have one or more input terminals, to which input devices such as emergency-stop buttons, two-hand operator buttons, guard doors or light barriers can be connected. An evaluation and control unit evaluates the input signals from these input devices in a failsafe manner and produces a switching signal on an output side as a function of them, once again in a failsafe manner. The switching signal controls actuators, in particular contactors, by means of which the machine is disconnected, once again in a failsafe manner.

The term "failsafe" in this context means that disconnection of the machine must be ensured in all circumstances, and even when a functional fault occurs within the chain comprising the input device, the safety switching device and the actuator. Safety switching devices must therefore be designed such that they ensure that the machine being monitored is always in a safe state, even in the event of failure of a component, in the event of cable breaks, or in the event of other malfunctions. Accordingly, the term safety switching device in this context refers only to those devices and appliances which comply at least with Category 3 of European Standard EN 954-1, or comparable requirements.

Conventionally, safety switching devices of this generic type have until now and are still often designed with discrete components and with electromechanical switching elements (relays). Only in the last few years have changes been made to designing safety switching devices which also make use of electronic components and, in particular, electronic switching elements (bipolar and/or field-effect transistors). WO 01/67610 A1 discloses safety switching devices and apparatuses with combined safety switching devices which produce potential-related switching signals at the output. In contrast to this, conventional safety switching devices use floating outputs. Owing to the potential-related outputs, it is no longer useful to connect the outputs of two or more safety switching devices according to WO 01/67610 A1 in series with one another in order to implement an apparatus comprising a plurality of safety switching devices. WO 01/67610 A1 therefore proposes a new approach of combining safety switching devices having potential-related outputs. In this approach, the potential-related outputs of a first safety switching device are connected to specific inputs of a downstream, second safety switching device. This results in an apparatus which can be used in a very flexible and versatile manner. However, in the case of the apparatus of WO 01/67610 A1, at least two potential-related outputs of the first safety switching device have to be connected in parallel with at least two corresponding inputs of the second safety switching device in order to achieve maximum fail-safety.

DE 100 37 737 A1 discloses a method and an apparatus for safe single-channel evaluation of sensor signals. In this case, specific redundant signals are derived from redundantly produced sensor signals. All the signals are then digitized, are converted to a single-channel digital signal, and are transmitted to a higher-level processing unit. However, this method is not suitable for a combination of two or more safety switching devices of the type described above to form a system of safety switching devices as is known from WO 01/67610 A1.

SUMMARY OF THE INVENTION

It is an object of the present invention to provide an apparatus having combined safety switching devices which can be installed and connected in a simpler and faster manner, such that quicker installation in a production system is enabled.

It is another object to provide safety switching devices that allow a simpler and less costly installation in an combination of safety switching devices.

According to one aspect of the invention, this object is achieved by an apparatus having a first and at least one second safety switching device each operatively connected to at least one of the electrical loads, with the first safety switching device comprising a first evaluation and control unit, an output and an electronic switching element for producing a potential-related switching signal at the output under the control of the first evaluation and control unit, the potential-related switching signal activating or de-activating at least one of the electrical loads, with the second safety switching device comprising an input and a second evaluation and control unit operatively connected to the input for receiving the potential-related switching signal, wherein the output and the input are connected to one another via a single-channel connecting line, and wherein the second safety switching device comprises at least two input stages to which the potential-related switching signal is supplied redundantly with respect to one another, the two input stages each monitoring the potential-related switching signal redundantly with respect to one another.

According to another aspect, this object is achieved by an apparatus for fail-safely disconnecting an electrical load, the apparatus having a first and at least one second safety switching device, with the first safety switching device comprising a first evaluation and control unit, an output and an electronic switching element for producing a potential-related switching signal at the output under the control of the first evaluation and control unit, with the second safety switching device comprising an input for receiving the potential-related switching signal, the output and the input being connected to one another via a single-channel connecting line, wherein the second safety switching device comprises at least two input circuits to which the potential-related switching signal is supplied redundantly with respect to one another.

According to yet another aspect, there is provided a safety switching device for fail-safely disconnecting an electrical load, having an input for receiving a potential-related switching signal, having at least two input stages for evaluating the potential-related switching signal, and having an output for disconnecting the load as a function of the potential-related switching signal, wherein the two input stages are configured to evaluate the potential-related switching signal redundantly with respect to one another.

According to yet another aspect, there is provided a safety switching device for fail-safely disconnecting an electrical load, having an evaluation and control unit, an output and an electronic switching element configured to produce a potential-related switching signal at the output under the control of the evaluation and control unit, wherein the output is designed with a single channel output for connection to a single-channel connecting line.

The invention is based on the surprising discovery that adequate failsafety can be ensured even with a single-channel connecting line between the first and the second switching devices. This was most unexpected, since absolute redundancy in all circuit components was unanimously regarded as being necessary for the design and construction of safety switching apparatuses. However, in the present case, the connecting line between the two safety switching devices may be a single-channel line since safety-critical situations resulting from component failures and the like are dealt with in a different way. Specifically, if one or more contactors is or are also connected to the single-channel connecting line in addition to the second safety switching device, the connection and disconnection of the contactors can be monitored in a failsafe manner by feeding back the interlocked auxiliary contacts of the contactors in a manner known per se to an input of the first safety switching device. In this situation, there is no need to connect the contactors to two separate, redundant connecting lines.

If, in contrast, no contactors are connected to the signal-channel connecting line in a practical implementation, it is not possible to monitor the potential-related switching signal at the output of the first switching device. However, it has been found that there is no need for such monitoring in this situation, since a switching process now takes place only at the output of the second safety switching device. It is thus sufficient to evaluate the potential-related switching signal at the input of the second switching device in a failsafe manner, i.e. generally by means of two channels. The second safety switching device accordingly comprises at least two mutually redundant input circuits here.

In the case of the novel apparatus, the first and the second safety switching devices are thus now connected to one another only via the single-channel connecting line, thus reducing the installation wiring complexity. Installation can thus be carried out more easily and quickly. Furthermore, the first safety switching device requires fewer output terminals, and the second safety switching device requires fewer input terminals. In consequence, the physical size of the safety switching devices can be reduced, or terminals are available for other purposes, if the physical size is the same. The present invention thus also leads to cost reductions in the design and production of safety switching devices according to the invention.

In a preferred refinement, the first safety switching device comprises a modulator which provides the potential-related switching signal with a steady-state signal component and a dynamic signal component.

In this refinement, the first safety switching device is able to apply two autonomous signal information items to the switching signal, which is transmitted on only one channel. This makes it possible to transmit mutually redundant information to the second safety switching device despite the connecting line having only a single channel. Admittedly, this is not absolutely essential for failsafe implementation, even for the (most stringent) Safety Category 4 in European Standard EN 954-1, for the reasons already explained above, but it simplifies an installation such as this. In particular, this refinement allows greater flexibility for the external connection of actuators, in particular contactors, to the safety switching device. The installation of the novel apparatus is thus even further simplified.

In a further refinement, the steady-state signal component is a positive signal level, and the dynamic signal component includes at least one cyclically repeated pulse which changes the positive signal level. In principle, the pulse may be positive or negative. The duration of the cyclically repeated pulse is preferably very short in comparison to the time during which the potential-related switching signal is at the positive signal level. Pulse durations of 1 millisecond or less have been found to be advantageous in practical experiments.

This refinement allows contactors to be connected directly, i.e. without further interface circuits, to the single-channel connecting line between the first and the second safety switching device. The second safety switching device and, if applicable, further downstream safety switching devices can thus initiate switching processes which do not influence the afore-mentioned contactors. This allows simple design of a hierarchical control system, by means of which different parts of an overall system can be disconnected in different groups. For example, this means that it is possible to disconnect power from the entire machine system on operation of an emergency stop switch which is connected to the first switching device, while only a valve or a single drive is disconnected on opening of a guard door which is connected to a second safety switching device. Provided that the duration of a single pulse is short in comparison to the tripping time of the contactors that are used, the switching function of the contactors is not influenced by the dynamic signal component, even if the pulses are negative.

In a further refinement, the at least two input circuits of the second safety switching device have at least two mutually redundant threshold value comparators.

In this refinement, the second safety switching device essentially evaluates the steady-state signal component, in particular the signal level applied to the potential-related switching signal. Owing to the redundancy, this evaluation is carried out here in such a way as to comply with the requirements for Category 4 of EN 954-1. This measure represents a simple and cost-effective option for achieving a high degree of failsafety despite the connecting line having only a single channel.

In a further refinement, at least one input circuit has a threshold value comparator, and another input circuit has a pulse detector.

In this refinement, the second safety switching device is able to evaluate both a steady-state signal component and a dynamic signal component of the potential-related switching signal. Accordingly, the second safety switching device of this refinement is particularly suitable for complete evaluation of redundant signal information which is transmitted from the first safety switching device on a single channel. This measure represents a further simple option for ensuring the desired failsafety of the entire arrangement. Furthermore in this refinement, the evaluation is carried out with diversity, which, as is known, leads to an even higher degree of fail-safety.

In a further refinement, the first safety switching device has at least one threshold value comparator, preferably at least two mutually redundant threshold value comparators. The threshold value comparator or comparators is or are supplied on the input side with the potential-related switching signal, and is or are connected on the output side to the first evaluation and control unit.

In this refinement, the first safety switching device is able to monitor the level of the potential-related switching signal at the output by itself. In the preferred refinement, this even complies with the requirements of Category 4 of EN 954-1, owing to the mutually redundant threshold value comparators. The refinement makes it easier to connect external contactors to the single-channel connecting line since correspondingly fewer external safety measures need be implemented.

In a further refinement, at least two external switching elements, in particular contactors, are also connected to the single-channel connecting line.

In this refinement, the novel apparatus makes use of the advantages already explained above. The refinement allows simple design of a hierarchical control system, in which the individual hierarchy levels are determined simply by the position of the external switching elements in the chain of the safety switching devices. This avoids programming effort, in comparison to complex safety control systems.

In a further refinement, the external switching elements are electromechanical switching elements, each having at least two interlocked switching contacts.

This refinement also benefits from the advantages already explained above. In this refinement, the interlocked auxiliary contacts can very easily be used for additional feedback to the input of the first safety switching device, thus further increasing the degree of failsafety of the entire apparatus.

In a further refinement, one of the interlocked switching contacts is connected to one input of the first safety switching device.

This refinement advantageously makes use of the capabilities provided by interlocked auxiliary contents. An apparatus which complies with the requirements for the (most stringent) Safety Category 4 in EN 954-1 or comparable requirements can thus be produced in a particularly simple manner.

In a further refinement, the external switching elements are connected to a reference ground potential separately from the first safety switching device.

In this refinement, the external switching elements are connected to a ground rail or the like, separately from the first safety switching device. As an alternative to this, it is in principle possible (as is frequently done in practice) to connect external switching elements to the reference ground potential (ground) via one terminal on the first safety switching device. In comparison to this, the preferred refinement offers better safety since, in this case, an inadvertent switching reaction of the second safety switching device is precluded even without any additional safety measures, such as the use of redundant signal information. The degree of failsafety of the entire apparatus is thus further increased.

In a further refinement, the second safety switching device has at least one further input for reception of a further switching signal, and has a logic unit which logically interconnects the further switching signal and the potential-related switching signal.

The logic operation is preferably an AND operation, although it may also be an OR operation, or any other logic operation. The second safety switching device interconnects the further switching signal, which is produced, for instance, by an external input device or by another safety switching device, to the potential-related switching signal of the first safety switching device. This refinement allows a very flexible implementation of the novel apparatus, with a large number of variants.

It goes without saying that the features which have been mentioned above as well as those which will be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description and are illustrated in the drawing, in which.

DETAILED DESCRIPTION OF PREFERRED EMBODIMENTS

Figure 1:
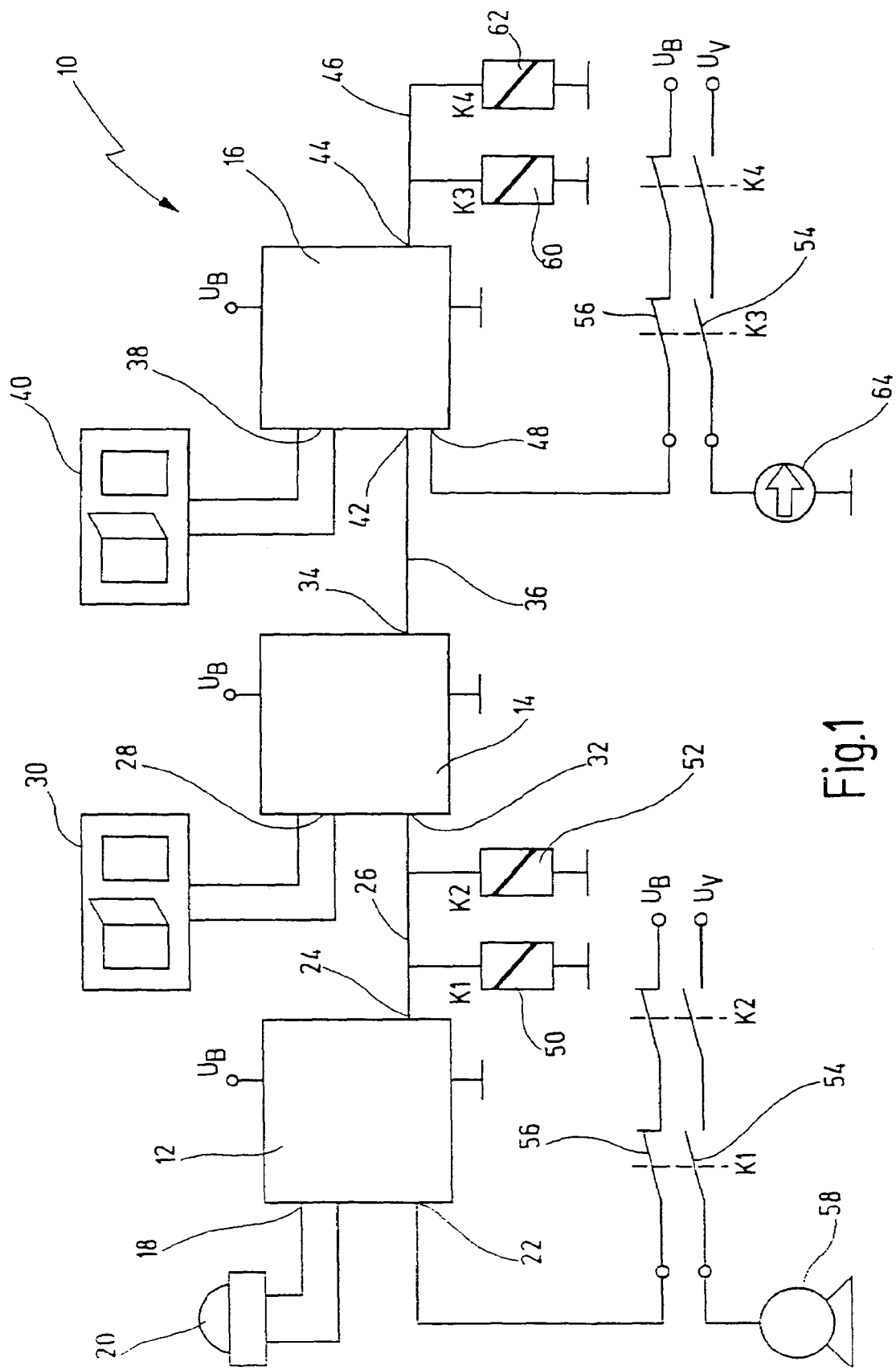
FIG. 1 shows an exemplary embodiment of an apparatus according to the invention, illustrated schematically.

In FIG. 1, reference number 10 denotes an apparatus according to the invention in its totality.

In the present embodiment, the apparatus 10 comprises three safety switching devices 12, 14, 16, which are combined to form a safety switching device system, in the manner which will be explained in the following text. The safety switching device 12 is a first safety switching device based on the terminology of the present invention, and it has an input 18 to which, in this case, an emergency stop button 20 is connected via two channels. A further input is annotated with the reference number 22. A feedback signal is connected to this input in a manner which will be described in more detail in the following text.

The safety switching device 12 furthermore has a single-channel output 24, to which a single-channel connecting line 26 is connected.

In principle, the safety switching device 14 is physically similar to the safety switching device 12. However, it differs from the latter in details, in particular by in this case being designed for connection of a guard door. For this purpose, the safety switching device 14 has an input 28 to which a guard 30 is connected via two channels. A further input is designated with reference number 32. Input 32 is designed as a single channel input, and it is connected via the connecting line 26 to the output 24 of the safety switching device 12.

Consequently, safety switching device 14 is here a second safety switching device in terms of the present invention. Furthermore, however, safety switching device 14 also has the function of a first safety switching device in terms of the present invention, since it is in turn connected upstream of safety switching device 16.

Safety switching device 14 likewise has a single-channel output, which in this case is designated with reference number 34. A connecting line 36, which once again is in the form of a single channel, is connected to the output 34.

The design of safety switching device 16 corresponds to that of the safety switching device 14. In the present embodiment, it is once again a guard door monitoring device. Accordingly, it has an input 38 to which a guard 40 is connected, once again via two channels. A further input is designated by reference number 42. Input 42 is designed as a single channel, and it is connected via connecting line 36 to the output 34 of the safety switching device 14. A single-channel output of the safety switching device 16 is designated by reference number 44. A single-channel connecting line 46 is connected to the output 44. A further input is designated by reference number 48, and is used for feedback, in a manner which will be explained in more detail in the following text.

The configuration of the safety switching devices 12, 14, 16 as emergency stop or guard door monitoring devices should in this case be regarded only as being by way of example. They could equally well be in the form of two-handed button monitoring devices, rotation or speed monitoring devices, light barrier monitoring devices, or any other safety-based switching devices. Furthermore, the switching devices could also have an integrated sensor function. For example, the first safety switching device could be the output stage of a light barrier.

All of the safety switching devices mentioned above have further inputs and outputs in practice, although these are not all shown here for the sake of clarity. These inputs are used, inter alia, for connection of an operating voltage $U_B$ and for connection of a reference ground potential (ground). Furthermore, for example, safety switching device 14 has a further input, which is not shown here but corresponds to the respective input 22 or 48 of the switching devices 12 and 16.

Figure 2:
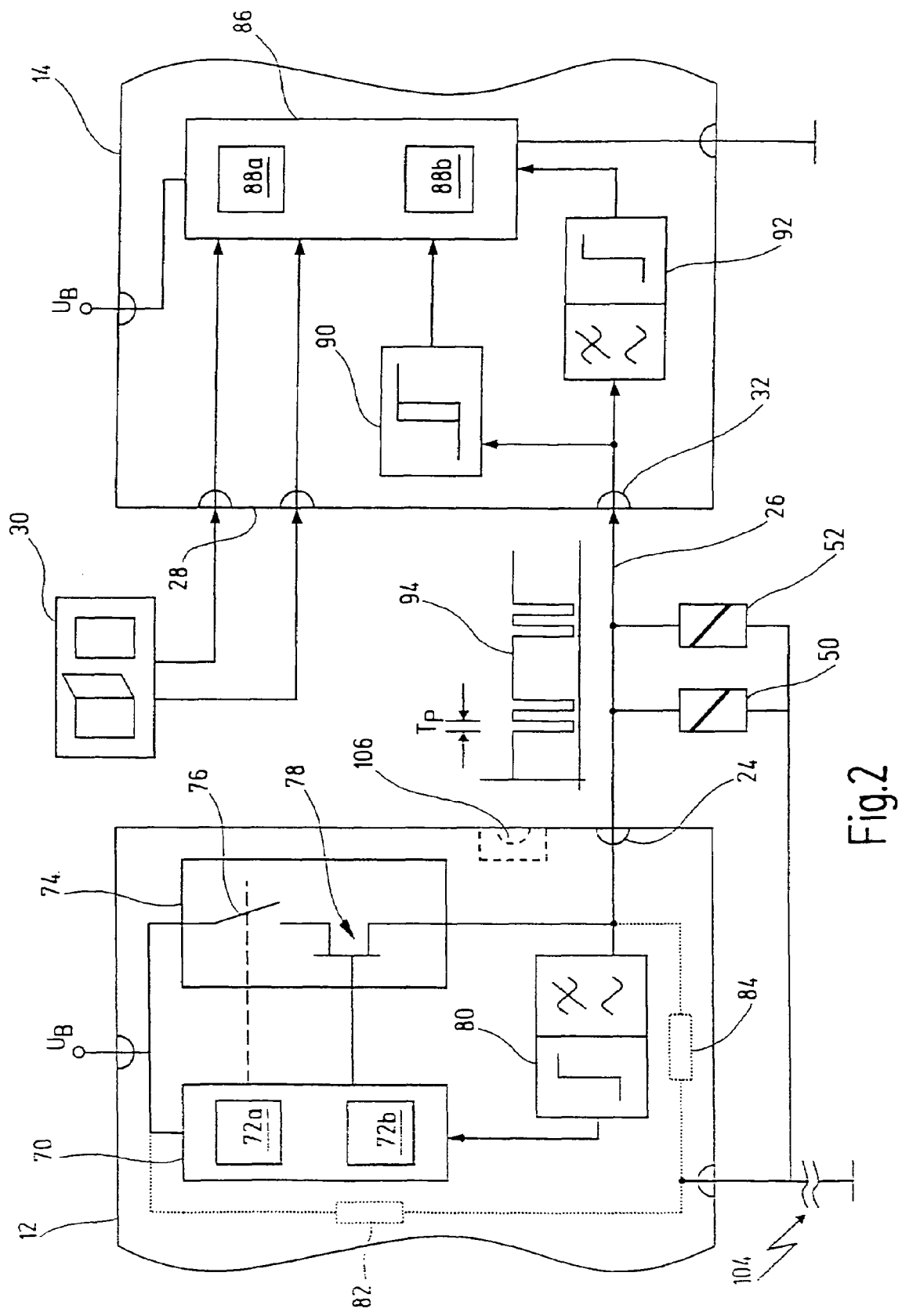
FIG. 2 shows details of the first and second safety switching devices in the exemplary embodiment shown in FIG. 1.

In the embodiment shown, two contactors K1 and K2 in parallel are connected to the single-channel connecting line 26, and they are referred to in the following text by reference numbers 50 and 52. Each second terminal of contactors 50, 52 is connected to the reference ground potential (ground) separately from the first safety switching device 12. This implementation is not absolutely essential for the embodiment shown here. Contactors 50, 52 could likewise be connected to the ground terminal of safety switching device 12, as is shown in FIG. 2.

Contactors 50, 52 each have at least one main contact 54 and one auxiliary contact 56, which are rigidly connected to one another in a manner which is known per se (interlocked or positively-guided contacts). As usual, main contact 54 is in the form of a make contact (normally open), while auxiliary contact 56 is in the form of a breakthrough contact (normally closed). The main contacts 54 of contactors 50, 52 are arranged in series with one another.

An element to be disconnected, for example a pump drive for a hydraulic press, is connected to one end of the series circuit. A supply voltage $U_V$ for the pump drive is connected to the other terminal of the series circuit, and can be disconnected in a failsafe manner by means of the main contacts 54 of the contactors 50, 52.

The auxiliary contacts 56 of the contactors 50, 52 are likewise connected in series. The operating voltage $U_B$ is applied to one end of this series circuit. The other end of this series circuit is connected to the input 22 of the safety switching device 12. Since the contacts are interlocked, the safety switching device 12 can check the switching position of the contactors 50, 52.

Two further contactors K3, K4 are connected in parallel in a corresponding manner to connecting line 46 at the output of switching device 16. Contactors K3, K4 are referred to in the following text by reference numbers 60, 62. The main and auxiliary contacts 54 and 56, respectively, of contactors 60, 62 are once again connected in series. The main contacts 54 are connected to another element that is to be disconnected, in this case, for example, a valve 64, and to a supply voltage $U_V$. In a similar manner to that in the case of the switching device 12, the auxiliary contacts 56 feed an operating voltage $U_B$ back to the input 48 of the safety switching device 16.

In the present case, apparatus 10 is used for safe disconnection of a hydraulic press. If emergency stop button 20 is operated, contactors 50, 52 disconnect the pump drive 58, i.e. the press (which is not illustrated here) is shut down completely. If, in contrast, one of the two guard doors 30, 40 is opened, only valve 64 is disconnected (closed) via the two contactors 60, 62. In this case, the pump drive 58 remains in operation. The apparatus 10 thus provides a hierarchical control system without complex programming measures, in which different control elements influence different functional areas of the press being monitored.

It goes without saying that, in other exemplary embodiments, the apparatus 10 may contain a considerably greater number of safety switching devices 12, 14, 16, which are combined with numerous control elements and sensors (emergency stop buttons, two-handed buttons, guard doors, rotation sensors etc.) as well as actuators (contactors or the like). One characteristic feature in this case is the capability to connect the switching devices to one another via single-channel connecting lines 26, 36, 46. Depending on the requirement, actuators may be connected to the single-channel connecting lines, for example the contacts 50, 52 and 60, 62 as illustrated in FIG. 1.

In the following description of further details of the apparatus 10 and of further exemplary embodiments, same reference symbols denote the same elements as in FIG. 1.

FIG. 2 shows the switching devices 12 and 14 schematically, with a number of details, essentially illustrating the output-side part of the switching device 12, for clarity reasons, while the input-side part of the switching device 14 is illustrated.

The safety switching device 12 has a two-channel evaluation and control unit 70 which, according to a preferred exemplary embodiment, includes two different microprocessors 72a, 72b (diversity). Reference number 74 denotes a switching element combination which in this case is formed from an electromechanical switching element (a relay 76) and an electronic switching element (a field-effect transistor 78) connected in series. In principle, a further electronic switching element could also be used here, instead of the relay. Furthermore, the electronic switching elements may also be bipolar transistors.

Reference number 80 denotes a threshold value comparator which, in the exemplary embodiment illustrated here, also contains an upstream low-pass filter. Threshold value comparator 80 allows the evaluation and control unit 70 to monitor the steady-state signal level of the switching signal at the output 24 of the safety switching device 12.

Reference number 82 symbolically represents the internal resistance of the safety switching device 12. As those skilled in the art will be aware, this internal resistance does not exist as a single physical entity in the safety switching device 12, but represents the resultant magnitude of the totality of all the components which do exist. The internal resistance 82 is significant in the subsequent analysis of possible faults which could adversely affect the failsafety of the apparatus 10.

Reference number 84 denotes another resistor 84, which is likewise illustrated only schematically here. Resistor 84 connects the drain connection of the field-effect transistor 78 to the reference ground potential. In a preferred embodiment, resistor 84 is a component of the filter circuit that is integrated in the threshold value comparator 80. However, this is not necessary for all exemplary embodiments. Resistor 84 is essentially illustrated here in order to indicate that a switching signal which is related to ground potential and is produced with the aid of the field-effect transistor 78 is produced at the output 24 of the switching device 12. In the present exemplary embodiment, the potential-related switching signal at the output 24 is either at a high level, which corresponds essentially to the operating voltage $U_B$, or is at a low level, which corresponds essentially to the ground potential.

The safety switching device 14 has a second evaluation and control unit, which is annotated here by reference number 86. The evaluation and control unit 86 likewise has two different microprocessors 88a, 88b, whose design and overall function correspond in principle to the evaluation and control unit 70 in the first safety switching device 12. The differences are essentially the special way in which the input devices connected to the inputs are evaluated. Furthermore, evaluation and control unit 86 is in this case described primarily with respect to its involvement in the reading of the potential-related switching signal, while the description of the evaluation and control unit 70 in this case relates primarily to the production of this switching signal.

Reference numbers 90 and 92 denote two mutually redundant input circuits or stages, to which the potential-related switching signal applied to the input 32 is supplied in parallel. The switching signal itself is annotated with reference number 94 in FIG. 2.

In this case, switching signal 94 has a steady-state signal component and a dynamic signal component. The steady-state signal component is the high level already mentioned above, by means of which, inter alia, the contactors 50, 52 are also activated. The high level is interrupted by brief negative pulses of duration $T_P$, which are produced with the aid of the evaluation and control unit 70 by appropriate keying of the field-effect transistor 78. The pulse duration $T_P$ is in this case shorter than the tripping time of the contactors 50, 52, so that the switch position of the contactors 50, 52 is not influenced by the pulses. According to a preferred embodiment, the pulses which are superimposed on the steady-state signal component are disconnection pulses, as are already known for safety switching devices of this generic type having semiconductor outputs. In the case of safety switching devices of this generic type, the disconnection pulses are used in order to make it possible to internally check the disconnection capability of the safety switching device 12.

According to another preferred embodiment, the evaluation and control unit 70 produces the pulses in accordance with a predetermined scheme, in the sense of pulse code modulation and/or pulse duration modulation. In one embodiment, the individual pulse sequences represent numbers, which are initially incremented and then decremented again. Overall, the potential-related switching signal may in this way be provided with redundant information, whose plausibility is checked by the second safety switching device 14 in order to achieve even better failsafety. The first evaluation and control unit 70 also carries out a modulator function for this purpose.

The first input circuit 90 of the second safety switching device 14 contains a pulse detector, which just evaluates the pulses contained in the switching signal 94. Each pulse results in an interrupt being triggered which starts a predetermined interrupt routine in the evaluation and control unit 86. The input circuit 92 in the present embodiment in contrast contains a threshold value comparator 92, similar to the threshold value comparator 80. The switching threshold of the threshold value comparator 92 is, however, considerably higher than that of the threshold value comparator 80, and it corresponds essentially to the high level of the switching signal 94.

The method of operation of the two safety switching devices 12 and 14 is, for the purposes of the apparatus 10, as follows:

When the system being monitored, i.e. the hydraulic press in the example shown in FIG. 1, is operating normally, the safety switching device 12 produces switching signal 94, which is illustrated in FIG. 2 and has a steady-state signal component corresponding to the high level. Contactors 50, 52 are thus activated, and the pump drive 58 operates. The safety switching device 14 uses the two input circuits 90, 92 and the evaluation and control unit 86 to evaluate the switching signal 94, and produces a comparable switching signal at its output (not illustrated here). This is supplied to the third safety switching device 16, as shown in FIG. 1. Safety switching device 16 in turn and in a comparable manner produces a further switching signal 94, on the basis of which contactors 60, 62 are activated, so that valve 64 is also opened.

If now the emergency stop button 20 is operated, or the evaluation and control unit 70 identifies an internal fault in the safety switching device 12, the evaluation and control unit 70 switches off the field-effect transistor 78. In consequence, switching signal 94 assumes a steady-state low level, and this is detected in the safety switching device 14 with the aid of the input circuit 92. The evaluation and control unit 86 then switches off the switching element combination associated with it (not illustrated here). The disconnection signal is then passed to the third safety switching device 16, which then disconnects th contactors 60, 62. The entire monitored system is thus disconnected after operation of the emergency stop button 20.

If one of the two guard doors 30, 40 is operated instead of the emergency stop button 20, the safety switching device 14, 16 connected to it switches the switching signal produced at its output to the low level. This once again results in all the subsequent components in the chain being disconnected. Those components which are upstream of the deactivated safety switching device, i.e. the safety switching device 12 and the contactors 50, 52 in the embodiment shown in FIG. 1, remain activated, however.

The evaluation and control unit 70 in the first safety switching device 12 can check the success of the disconnection process on the one hand with the aid of the threshold value comparator 80 and on the other hand on the basis of the auxiliary contacts 56 of the contactors 50, 52, which are fed back to the input 22. The switch position of the contactors 50, 52 is here also checked during the disconnection process, on the basis of the auxiliary contacts. This allows single-fault safety monitoring of the disconnection process at the output of the safety switching device 12. If, by way of example, field-effect transistor 78 cannot draw the potential at the output 24 to ground despite the disconnection command from the evaluation and control unit 70, the evaluation and control unit 70 can carry out the disconnection process redundantly, with the aid of the relay 76. Both the disconnection process and its monitoring are thus entirely based on two channels.

Safety switching device 14 likewise uses two channels to evaluate the presence or absence of the switching signal 94. Single-fault safety is therefore ensured in the sense of Category 4 of EN 954-1 overall.

Figure 3:
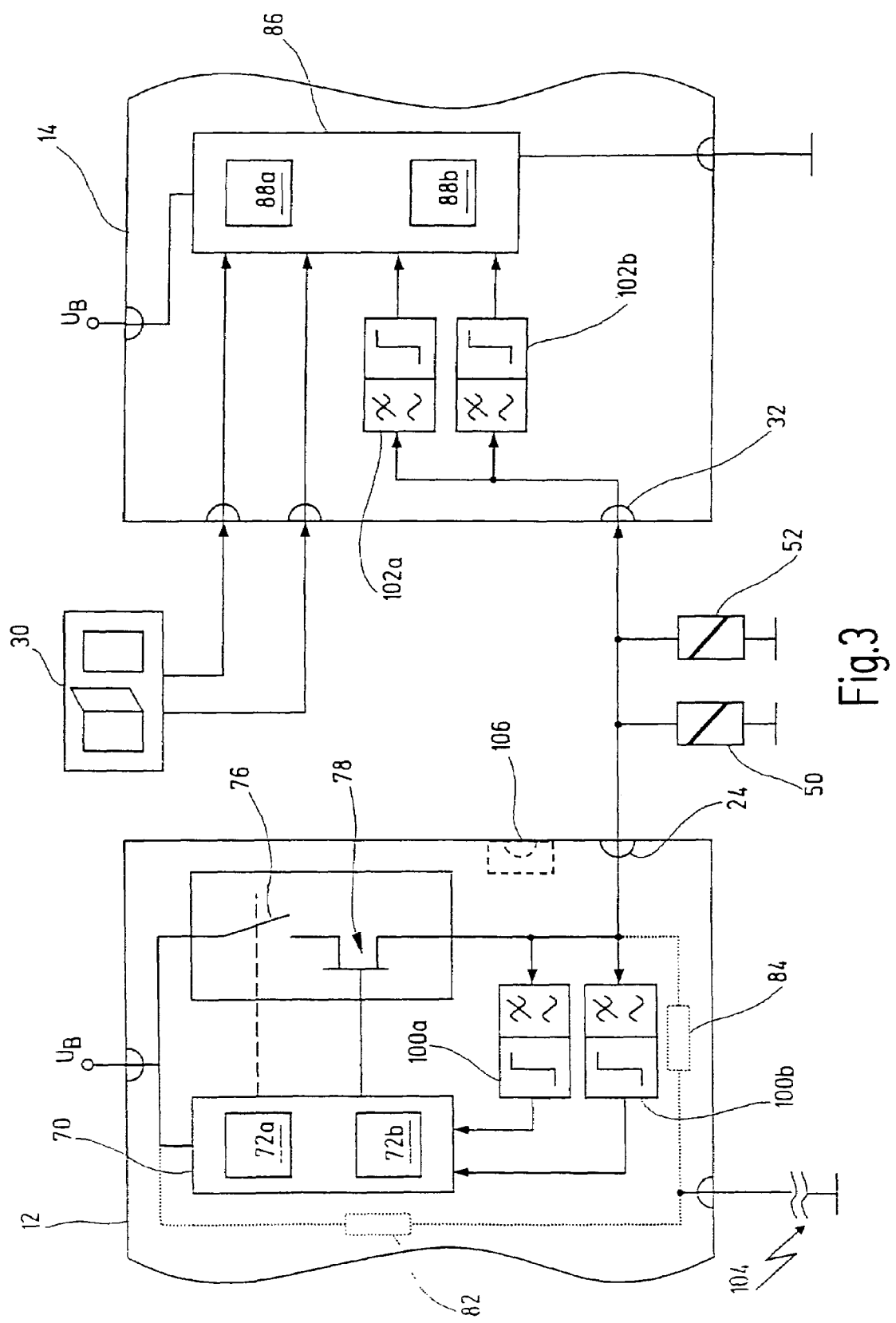
FIG. 3 shows details of the first and second safety switching devices in a further exemplary embodiment of the invention.

FIG. 3 illustrates details of another embodiment, whose fundamental design again corresponds to that in FIG. 1. Same reference symbols once again denote the same elements as before.

In contrast to the exemplary embodiment shown in FIG. 2, first safety switching device 12 in this case has two mutually redundant threshold value comparators 100a, 100b. Furthermore, second safety-switching device 14 has two input circuits 102a, 102b, which each have one threshold value comparator. The threshold value comparators 100a, 100b are set, redundantly with respect to one another, to a switching threshold which is slightly above but close to 0 V (approximately equal to ground potential). The threshold value comparators in the input circuits 102a, 102b are set, redundantly with respect to one another, to a switching threshold which corresponds approximately to the high level of the switching signal that is produced by the safety switching device 12. Since both threshold value monitoring processes are based on two channels, this once again achieves single-fault safety. Thus, in principle, there is no need either for the production and evaluation of dynamic signal components, i.e. pulses superimposed on the switching signal, or for feeding back the auxiliary contacts 56 of the contactors 50, 52. However, these measures which are shown in FIGS. 1 and 2 may also be used in addition to the implementation illustrated in FIG. 3. Furthermore, a combination of the alternatives shown here is possible. For example, in further exemplary embodiments, the output of the safety switching device 12 can be designed as illustrated in FIG. 2, while the input of the safety switching device 14 corresponds to that shown in FIG. 3. Furthermore, the output of the safety switching device 12 may correspond to the illustration shown in FIG. 3 with the dynamic signal components being produced in the switching signal with the aid of the evaluation and control unit 70, or with the aid of a modulator, which is not illustrated here. The safety switching device 14 then corresponds to the alternative illustrated in FIG. 2.

These various permutations are subject to a restriction if the ground potential of the contactors 50, 52 is connected to the ground connection of the safety switching device 12, as is illustrated in FIG. 2. In this case, if the ground connection is lost as a result of a cable break, as indicated by arrow 104 in FIGS. 2 and 3, a current could flow into the input 32 of safety switching device 14 via the internal resistance 82 of safety switching device 12 and via contactors 50, 52; and this even in the case that output 24 of safety switching device 12 is disconnected (switching signal at low level). In consequence, safety switching device 14 and all of the downstream safety switching devices would not be disconnected, even though safety switching device 12 has been disconnected. This fault can be prevented by connecting the contactors 50, 52 to the ground potential separately from the first safety switching device 12. Alternatively, and/or in addition, this fault can also be covered by using the pulse detector 90 to evaluate dynamic signal components in the switching signal 94.

Finally, for the sake of completeness, it should be mentioned that the safety switching device 12, in the same way as the other switching devices 14, 16, may have two or more single-channel outputs of the type described here. This is indicated in FIGS. 2 and 3 by the schematically illustrated output 106. Further safety switching devices and/or further contactors may be connected to the output 106, and are driven by the evaluation and control unit 70 independently of those components which are connected to the output 24.

Furthermore, it is generally possible to combine the exemplary embodiments described here with implementations as disclosed in WO 01/67610 A1 which is incorporated here by reference.

What is claimed is:

1. In an industrial production plant having a plurality of electrical loads, an apparatus for fail-safely disconnecting at least one of the electrical loads in order to prevent hazards originating from the production plant, the apparatus having:
a first and at least one second safety switching device each operatively connected to at least one of the electrical loads,
with the first safety switching device comprising a first evaluation and control unit, an output and an electronic switching element for producing a potential-related switching signal at the output under the control of the first evaluation and control unit, the potential-related switching signal activating or de-activating at least one of the electrical loads,
with the second safety switching device comprising an input and a second evaluation and control unit operatively connected to the input for receiving the potential-related switching signal,
wherein the output and the input are connected to one another via a single-channel connecting line, and
wherein the second safety switching device comprises at least two input stages to which the potential-related switching signal is supplied redundantly with respect to one another, the two input stages each monitoring the potential-related switching signal redundantly with respect to one another.

2. The apparatus of claim 1, wherein the at least two input stages comprise at least two mutually redundant threshold value comparators for monitoring a signal level of the potential-related switching signal.

3. The apparatus of claim 1, wherein at least one input stage comprises a threshold value comparator for monitoring a signal level of the potential-related switching signal, and another input stage comprises a pulse detector for detecting signal pulses of the potential-related switching signal.

4. An apparatus for fail-safely disconnecting an electrical load, the apparatus having a first and at least one second safety switching device, with the first safety switching device comprising a first evaluation and control unit, an output and an electronic switching element for producing a potential-related switching signal at the output under the control of the first evaluation and control unit, with the second safety switching device comprising an input for receiving the potential-related switching signal, the output and the input being connected to one another via a single-channel connecting line, wherein the second safety switching device comprises at least two input circuits to which the potential-related switching signal is supplied redundantly with respect to one another.

5. The apparatus of claim 4, wherein the first safety switching device further comprises a modulator which provides the potential-related switching signal with a steady-state signal component and a dynamic signal component.

6. The apparatus of claim 5, wherein the steady-state signal component is a positive signal level, and the dynamic signal component includes at least one cyclically repeated pulse for changing the positive signal level.

7. The apparatus of claim 4, wherein the at least two input circuits comprise at least two mutually redundant threshold value comparators.

8. The apparatus of claim 4, wherein at least one input circuit comprises a threshold value comparator, and another input circuit comprises a pulse detector.

9. The apparatus of claims 4, wherein the first safety switching device further comprises at least one threshold value comparator having an input side where the potential-related switching signal is fed back to, and having an output side connected to the first evaluation and control unit.

10. The apparatus of claim 9, wherein the first safety switching device comprises at least two mutually redundant threshold value comparators, with each redundant threshold value comparator being fed back with the potential-related switching signal.

11. The apparatus of claim 4, further comprising at least two external switching elements connected to the single-channel connecting line.

12. The apparatus of claim 11, wherein the external switching elements are electromechanical switching elements, each having at least a first and a second switching contact which are mutually interlocked.

13. The apparatus of claim 12, wherein each first switching contact is connected to the first safety switching device.

14. The apparatus of claim 11, wherein the external switching elements are connected to a reference ground potential separately from the first safety switching device.

15. The apparatus of claim 4, wherein the second safety switching device comprises at least one second input for receiving a second switching signal, and comprises a logic unit for logically interconnecting the second switching signal and the potential-related switching signal.

16. The apparatus of claim 4, wherein the first safety switching device comprises at least two outputs at which at least two mutually independent potential-related switching signals can be produced under the control of the first evaluation and control unit.

17. A safety switching device for fail-safely disconnecting an electrical load, having an input for receiving a potential-related switching signal, having at least two input stages for evaluating the potential-related switching signal, and having an output for disconnecting the load as a function of the potential-related switching signal, wherein the two input stages are configured to evaluate the potential-related switching signal redundantly with respect to one another.

18. The safety switching device of claim 17, wherein the at least two input stages comprise at least two mutually redundant threshold value comparators for monitoring a signal level of the potential-related switching signal.

19. The safety switching device of claim 17, wherein at least one input stage comprises a threshold value comparator for monitoring a signal level of the potential-related switching signal, and another input stage comprises a pulse detector for detecting signal pulses of the potential-related switching signal.

20. A safety switching device for fail-safely disconnecting an electrical load, having an evaluation and control unit, an output and an electronic switching element configured to produce a potential-related switching signal at the output under the control of the evaluation and control unit, wherein the output is designed with a single channel output for connection to a single-channel connecting line.

21. The safety switching device of claim 20, further comprising a modulator for providing the potential-related switching signal with a steady-state signal component and a dynamic signal component.

22. The safety switching device of claim 21, wherein the steady-state signal component is a positive signal level, and the dynamic signal component includes at least one cyclically repeated pulse which changes the positive signal level.

23. The safety switching device of claim 20, further comprising at least one threshold value comparator having an input side and an output side, wherein the input side is fed back with the potential-related switching signal, and wherein the output side is connected to the evaluation and control unit.

* * * * *